United States Patent [19]
Racine

[11] Patent Number: 5,806,240
[45] Date of Patent: Sep. 15, 1998

[54] SYSTEM FOR SUPPLYING DRIPPING WATER TO PLANT GROWING MEDIA

[76] Inventor: Pierre Racine, 286, chemin Ste-Anne-des-Lacs, Ste-Anne-des-Lacs, Québec, Canada, J0R 1B0

[21] Appl. No.: 899,298

[22] Filed: Jul. 23, 1997

[51] Int. Cl.⁶ .......................... A01G 25/02; A01G 29/00
[52] U.S. Cl. ................................. 47/79; 47/48.5
[58] Field of Search ................ 47/79, 48.5, 82; 222/568, 390, 20

[56] References Cited

U.S. PATENT DOCUMENTS

| | | | |
|---|---|---|---|
| 4,578,897 | 4/1986 | Pazar et al. | 47/79 X |
| 5,097,626 | 3/1992 | Mordock | 47/79 |
| 5,259,142 | 11/1993 | Sax | 47/48.5 |
| 5,517,790 | 5/1996 | Jennings | 47/79 X |
| 5,542,605 | 8/1996 | Campau | 47/79 X |
| 5,553,418 | 9/1996 | Mason et al. | 47/79 |
| 5,557,885 | 9/1996 | Sledge | 47/79 X |
| 5,568,701 | 10/1996 | Haigler | 47/48.5 |

Primary Examiner—Michael J. Carone
Assistant Examiner—Yvonne R. Abbott
Attorney, Agent, or Firm—Jean H. Dubuc

[57] ABSTRACT

A system for supplying dripping water to plant growing media comprises at least one water container and a support to hold the container upright over the soil to be watered. The support consists of a body having a soil engaging lower part and a water controlling upper part. A flexible tube is connected to a water passage provided in the upper part of the body. A screw is operated to compress the inner tube to control water passage in the tube and, consequently, the dripping rate of the water to the soil.

9 Claims, 3 Drawing Sheets

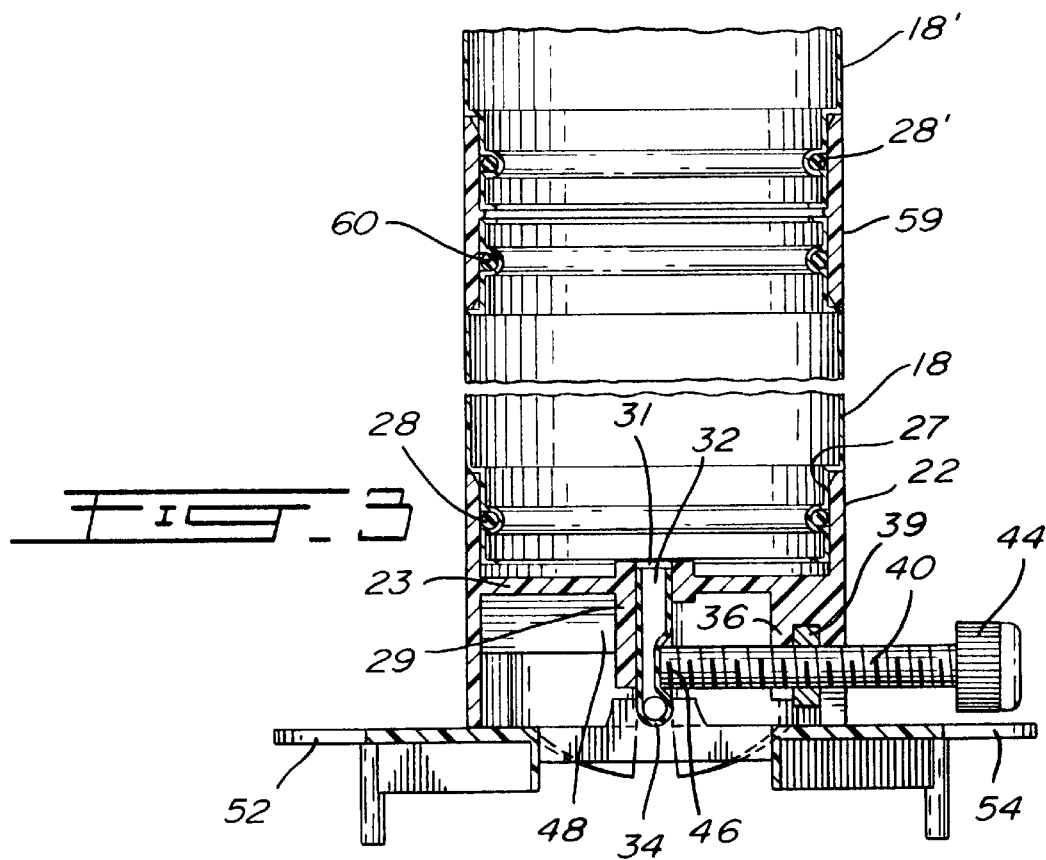
FIG_3
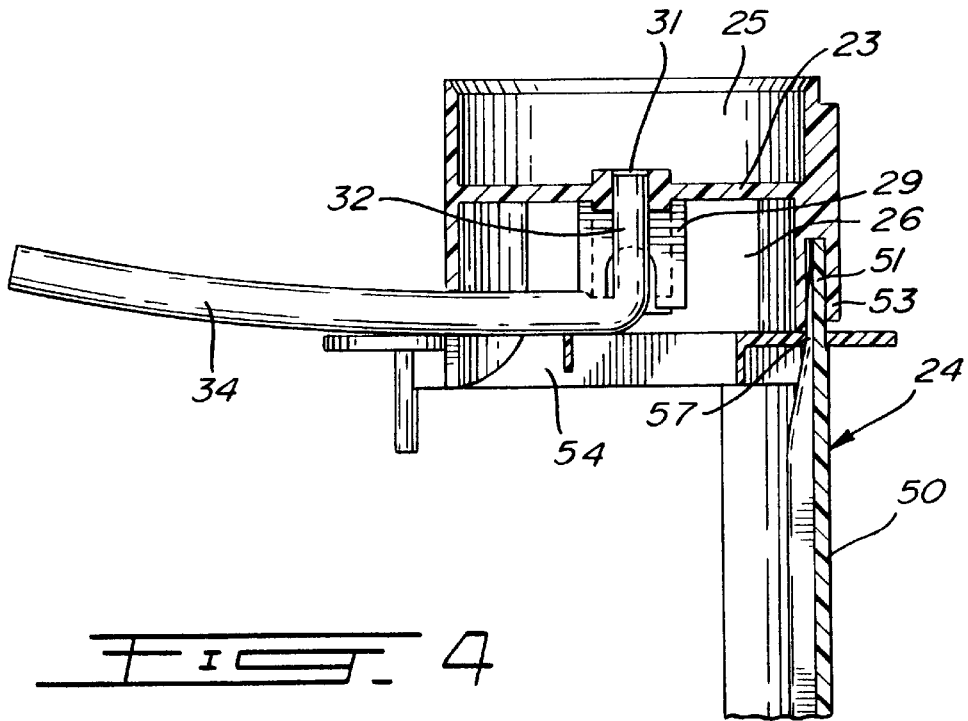
FIG_4

SYSTEM FOR SUPPLYING DRIPPING WATER TO PLANT GROWING MEDIA

FIELD OF THE INVENTION

The present invention pertains to a system for supplying dripping water to a medium adjacent to a plant over an extended period of time, such as for several days.

BACKGROUND OF THE INVENTION

Various patents have issued pertaining to plant irrigation devices: namely, U.S. Pat. No. 4,970,823 issued Nov. 20, 1990 to Erico Industries; U.S. Pat. No. 5,111,614 issued May 12, 1992 to Holtkamp; and U.S. Pat. No. 5,259,142 issued Nov. 9, 1993 to Sax. While these plant watering devices are concerned with the problem of supplying water to plants that remain unattended for long periods of time, none are concerned with controlling the dripping of water to ensure that the proper quantity of water will be dispensed in the soil for the period during which the plant cannot be attended.

OBJECTS AND STATEMENT OF THE INVENTION

The present invention is concerned with a system for watering plants which avoids the above problems. This is achieved by providing a water dripping device with means for controlling the water dripping rate.

It is also an object of the present invention to provide a water dispensing device for a plant which, in addition to provide a control of the discharging, also ensures that a supply of water is maintained sufficient for the time of absence of unattendance to the plant. This is achieved by providing a system in which the containers are so shaped that they may be stacked whereby a number of water filled containers may be placed over the soil adjacent to a plant in accordance with the time period of absence by persons attending the watering of the plants.

The present invention therefore relates to a system for supplying dripping water to plant growing media comprising:

a) container means for holding a supply of water; the container means having a water discharging outlet;

b) support means for holding the container means upright over media containing a plant; the support means including media engaging means and container receiving means adapted to tightly engage the water discharging outlet of the container means; water passage means in the water container means;

c) a flexible tube connected to the water passage means; and d) control means extending transversely through the support means and having an inner end contacting the flexible tube and an outer end manually graspable for forcing the inner end against the flexible tube to control the dripping of water from the container means to the media.

In one form of the invention, the control means consists of a screw which has one end compressing the tube so as to diminish or increase the water passage area.

In another form of the invention, the container is a bottle, the upper head of which has an inlet adapted to receive the water discharging outlet of an upper stacked container of similar shape.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 3 is a cross-sectional view taken along lines 3—3 of FIG. 2; and

FIG. 4 is an enlarged cross-sectional view showing the mounting of the flexible tube to the support.

DESCRIPTION OF PREFERRED EMBODIMENTS

Figure 1:
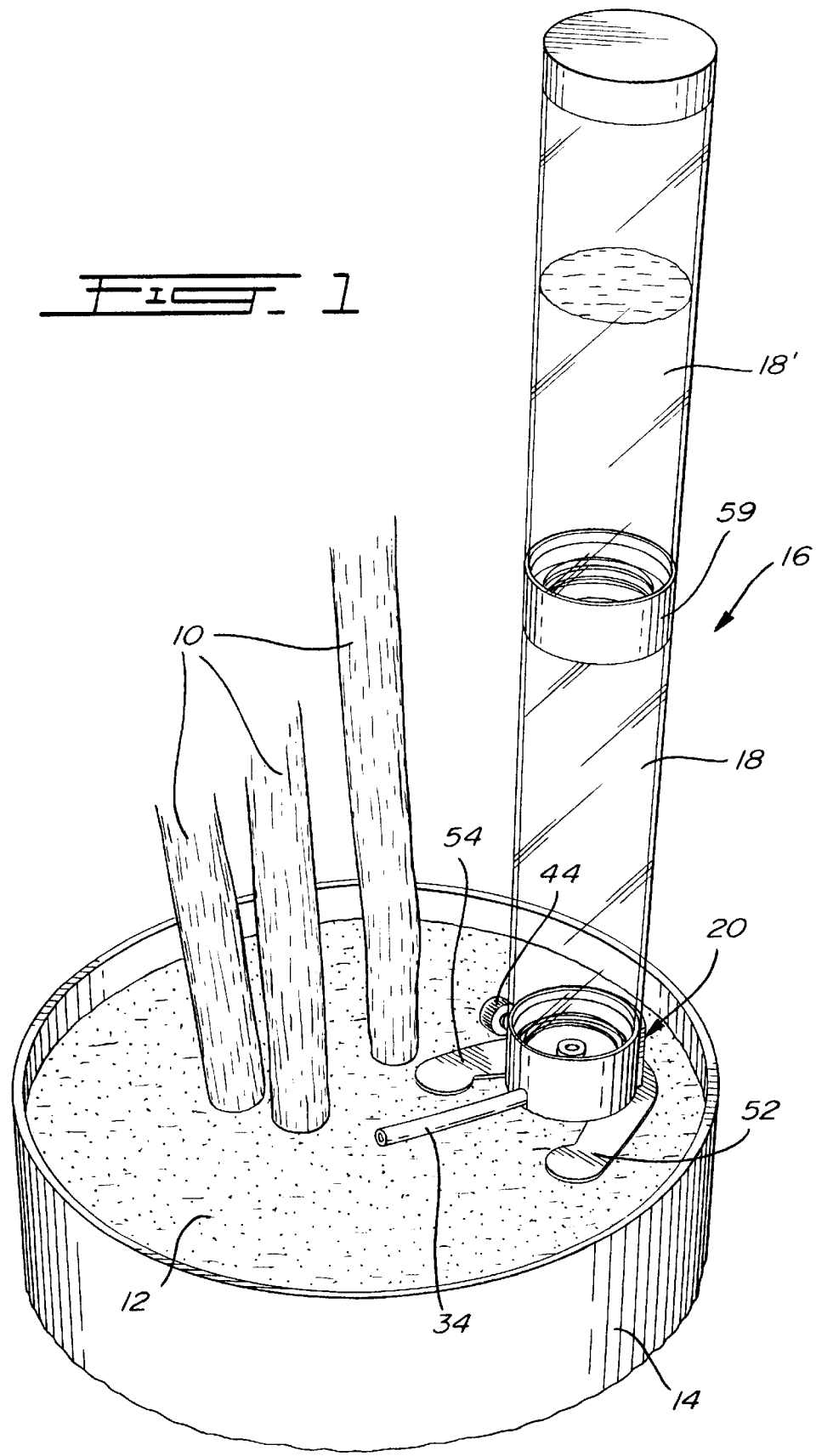
FIG. 1 is a perspective view showing a system made in accordance with the present invention, adjacent to a plant.

As shown in FIG. 1, stems 10 of one or more plants project from soil 12, or other growing medium, contained within a pot 14. The device of the present invention is intended to provide adequate watering to the soil; hence, pot 14 will not be present when the plants are directly in the ground.

The system for supplying dripping water to the soil is generally denoted 16 in FIG. 1. It consists of one or more containers 18, 18' which engage a support, generally denoted 20.

Figure 2:
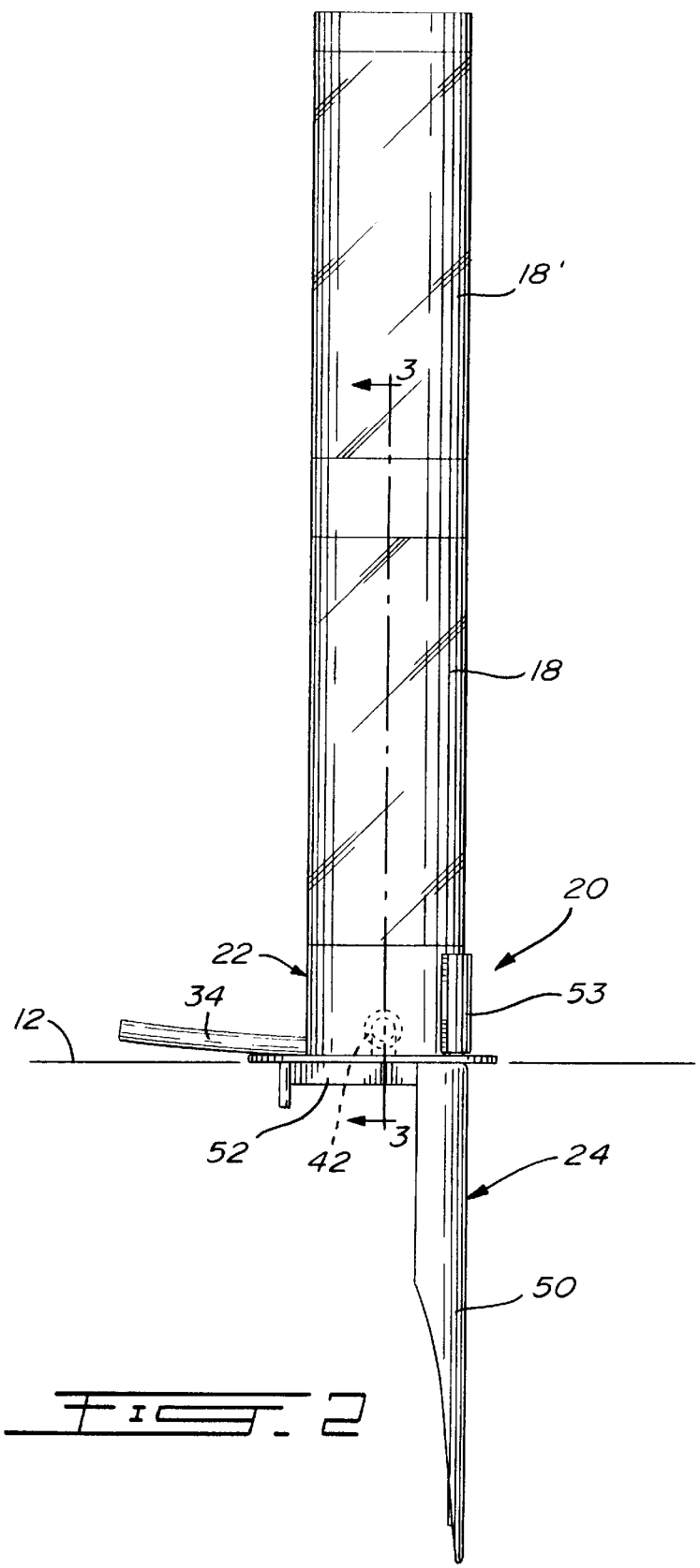
FIG. 2 is an elevation showing two containers in a stacked relationship mounted to a support.

Referring to FIG. 2, the support 20 comprises a container receiving element 22 and a soil engaging element 24. Referring also to FIGS. 3 and 4, element 22 has an intermediate horizontal wall 23 that defines an upper cavity 25 and a lower cavity 26. Cavity 25 receives therewithin the neck portion 27 at the water discharge end of the cylindrical container 18. A seal 28 fixed in an annular groove in the neck portion 27 provides a water tight connection between part 22 and container 18. From wall 23 extends downwardly a semi-cylindrical stopper wall 29. Wall 23 has a hole 31 receiving one end 32 of a transparent flexible tube 34. In the lower cavity 26, housing 36 integral with the inner wall 48 of element 22, receives a square-shaped nut 39 threadedly engaged with the threads 40 of a screw 42; the latter has a head portion 44 which extends outside element 22 and is manually graspable. The inner end 46 of the screw is in contact with the upper end 32 of the flexible tube 34, which bears against the stopper wall 29.

Referring to FIGS. 2 and 4, part 24 of the support 20 consists of a U-shaped pointed stake 50 having an upper flange 51 which is insertable in an arc-shaped slot of a side wall projection 53. To provide stability, a third element 55 having a pair of opposite wing-shaped stabilizers 52 and 54 rests on the top surface of the soil 12; an arc-shaped opening 57 through which passes flange 51 of element 24 is provided in this third component 54 of the system.

The container 18 is constructed so that similarly shaped containers can be engaged and stacked vertically to one another as illustrated in FIG. 3. Therefore, the upper end of the container 18 also includes an annular neck portion 58 with a seal 60 to provide a water tight fit with an annular ring 59, to which is also sealingly engaged the lower end of the upper container 18' via a seal 28'.

Therefore, depending on the length of period between which the plant will not be attended, water supplying is achieved by determining the number of water containers needed together with an adjustment of screw 42 which, by compressing the flexible tube, controls the rate of dripping of the water contained in these containers.

Although the invention has been described above with respect with one specific form, it will be evident to a person skilled in the art that it may be modified and refined in various ways. For example, there may be various ways of mounting and engaging the vertically stacked containers to one another. It is therefore wished to have it understood that the present invention should not be limited in scope, except by the terms of the following claims.

The embodiments of the invention in which an exclusive property or privilege is claimed are defined as follows:

1. A system for supplying dripping water to plant growing media comprising:
   a) container means for holding a supply of water; said container means having a water discharging outlet;
   b) support means for holding said container means upright over the media containing a plant; said support means including media engaging means and container receiving means adapted to tightly engage the water discharging outlet of said container means; water passage means in said water container means;
   c) a flexible tube connected to said water passage means; and
   d) control means extending transversely through said support means and having an inner end contacting said flexible tube and an outer end manually graspable for forcing said inner end against said flexible tube to control the dripping of water from said container means to the media.

2. A system as defined in claim 1, wherein said container means consists of a bottle having opposite opened ends including a water receiving inlet at one end and said water discharging outlet at an opposite end.

3. A system as defined in claim 2, wherein said container means consist of two or more of said open end bottles vertically stacked one above the other.

4. A system as defined in claim 3, wherein the vertically stacked open end bottles are sealingly engaged to one another by means of an annular ring.

5. A system as defined in claim 1, wherein said water outlet of said container means is sealingly engaged to said container receiving means.

6. A system as defined in claim 1, wherein said media engaging means is a pointed stake.

7. A system as defined in claim 6, wherein said media engaging means further include a body having a pair of wings to bear against the top surface of the media.

8. A system as defined claim 1, wherein said water passage means consists of a semi-cylindrical wall integral with said container receiving means and acting as a stopper against which said flexible tube bears when pressure is applied by said inner end of said control means thereon.

9. A system as defined in claim 1, wherein said control means consists of a screw threadedly engaged to said support means.

* * * * *